Figure 1:
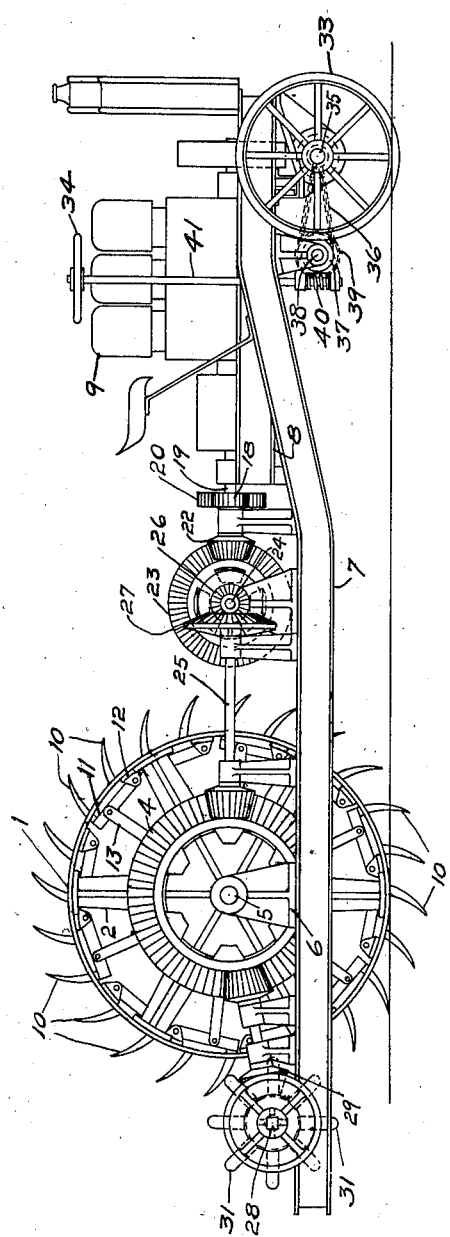

W. B. PRUGH.
ROLLING DRUM PLOW.
APPLICATION FILED OCT. 30, 1911.

1,079,920.

Patented Nov. 25, 1913.

3 SHEETS—SHEET 1.

WITNESSES.
A. R. Mitchell
Ellis Saunders

INVENTOR.
Walter B. Prugh,
By Millard Eddy, Atty

W. B. PRUGH.
ROLLING DRUM PLOW.
APPLICATION FILED OCT. 30, 1911.
1,079,920.
Patented Nov. 25, 1913.
3 SHEETS—SHEET 2.
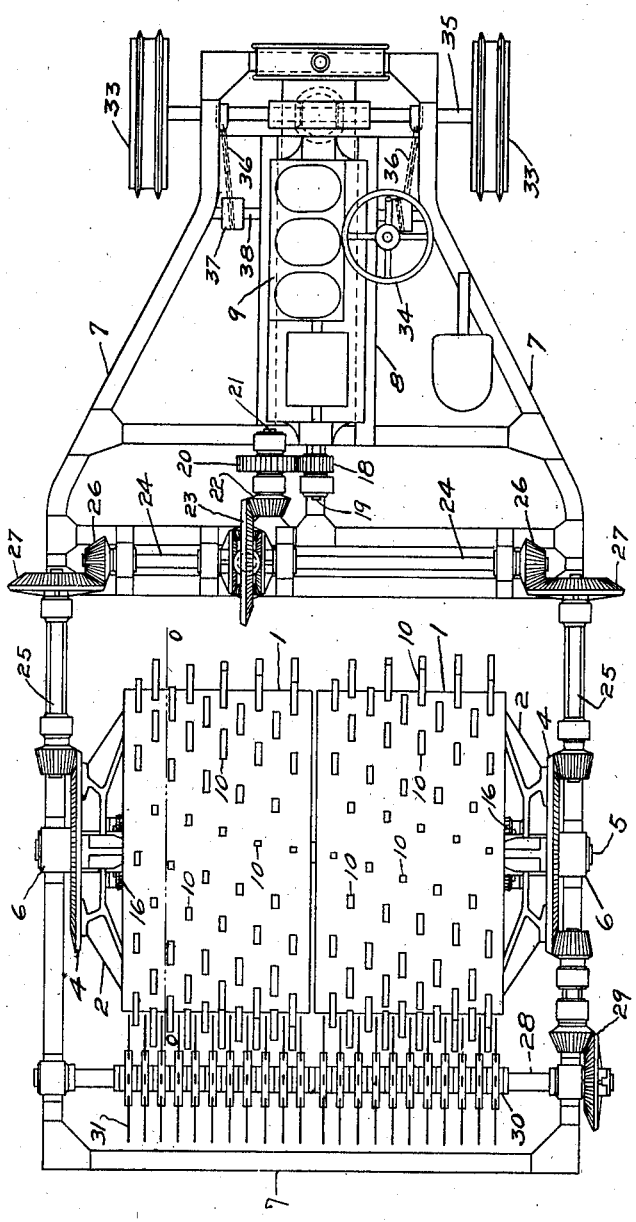
WITNESSES.
A. R. Mitchell
Ellis Saunders.
INVENTOR.
Walter B. Prugh
By Millard Eddy, Att.

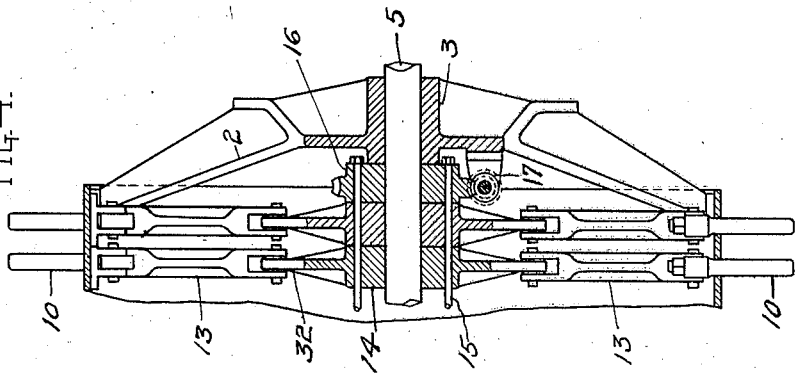
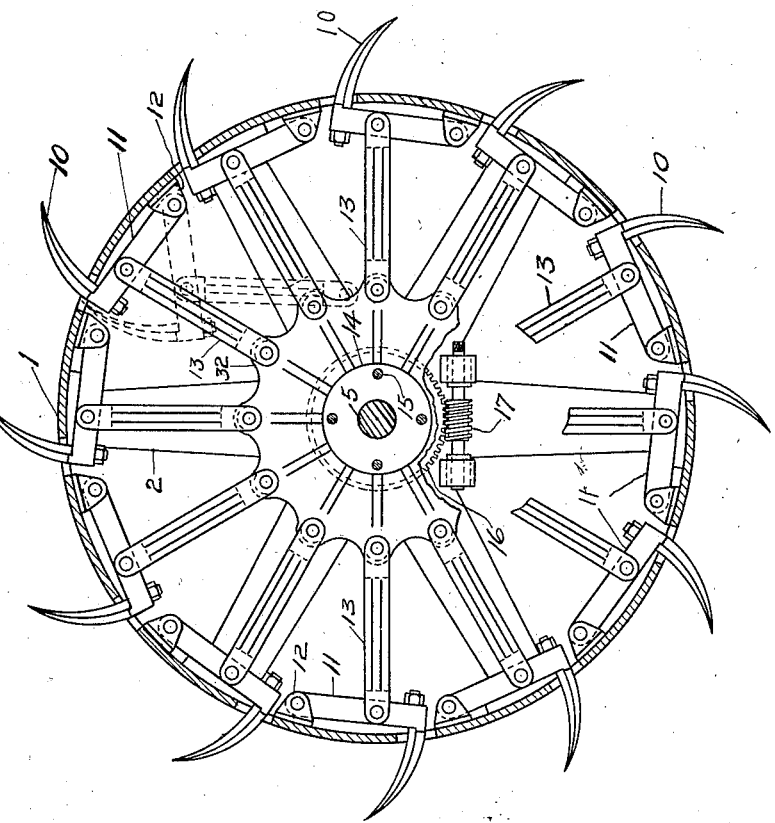

UNITED STATES PATENT OFFICE.

WALTER B. PRUGH, OF SINKIN, MISSOURI, ASSIGNOR TO PETER GRAVERT, OF BENSON, NEBRASKA.

ROLLING-DRUM PLOW.

1,079,920.

Specification of Letters Patent.

Patented Nov. 25, 1913.

Application filed October 30, 1911. Serial No. 657,418.

*To all whom it may concern:*

Be it known that I, WALTER B. PRUGH, of Sinkin, in Shannon county, Missouri, have invented certain new and useful Improvements in Rolling-Drum Plows, which improvements are described in the following specification and are illustrated by the accompanying drawings.

The invention relates to plows of that class in which a drum, provided with peripheral soil-stirring teeth and driven by a motor, rolls upon the ground that is being plowed.

In the operation of plows of this kind, as commonly constructed before this invention was made, the rolling drum, whenever it is steered aside from a straight course, and while in the act of turning, necessarily slides more or less upon the subjacent soil—
a movement which involves considerable expenditure of power, especially when resisted by the hold of the drum teeth in the soil. To avoid unnecessary expenditure of power in a movement of this kind, as well as to modify and diminish the movement itself, is one of the objects of the invention.

Another object of the invention is to adapt a plow of this class to work easily to various depths, as may be required in different soils and situations.

Yet another object of the invention is to adapt a plow of this class to travel under its own power without plowing and to work as a rolling-machine for smoothing and compacting the surface of streets, lawns, fields and the like.

A yet further object of the invention is to render the curved retractile teeth of such a plow adjustable in and out through the walls of the drum in circular arcs conformable to their own curvature, for the purpose of assimilating their movements in all operative positions of adjustment.

To accomplish these objects I incorporate in my improved plow a drum consisting of a pair of independently turning rollers, means for driving these rollers differentially, tooth-carrying lever arms pivoted within the rollers, and means for thereby adjusting the teeth to penetrate the soil little or much or not at all as may be required.

The best manner in which I have contemplated applying the principles of the invention, is shown in said drawings; but, as many changes can be made in the construction of the plow, and many apparently different embodiments of these principles can be produced, without departing from the scope or spirit of the invention, it is intended that all matters contained in the following description, or shown in these drawings, shall be interpreted as illustrative, and not in a limiting sense.

Figure 1 of the drawings is a side elevation of a plow which is constructed in accordance with these principles and has its drum teeth fully protruded for deep plowing. From this elevation, however, a part of the contents of the drum is omitted for the sake of clearness. Fig. 2 is a plan of the same plow with its retractile teeth in the same extended position. Fig. 3 is a vertical cross section on the section line O—O in Fig. 2. Fig. 4 is an axial section of an end portion of one of the drum rollers.

The divided drum of this plow comprises two duplicate hollow rollers, preferably of iron, denoted by the numeral 1. These rollers, having terminal heads, or spiders 2, and hubs 3, and being provided with terminal circular racks 4 for engagement with driving and driven pinions, are independently rotatable on the transverse axle 5, which is held by brackets or hangers 6 of the plow frame, 7. This frame, which may be of any preferred construction, is shown as consisting of iron beams having parallel horizontal portions at opposite ends of the drum, a transverse connecting portion behind the drum, and converging united portions in front of the drum. It carries, in advance of the drum, a platform 8, upon which is mounted a gas engine, or other suitable motor, 9, for operating the machine.

Each of the rollers 1 is armed with numerous retractile teeth 10, protrusive through suitable holes in its cylindrical wall. Within the roller its teeth are firmly mounted on the arms 11 pivoted in the lugs 12; and these arms being arranged in circular groups, as illustrated in Fig. 3, are connected by the links 13 with the radial arms 32 of the series of contiguous hubs 14 rotatable on the axle 5. So many of these hubs as occupy each of the rollers 1 are fastened by the bolts 15 to the gear 16 which is rotatable on that axle and meshes with the worm 17 affixed to the hub 3. This worm, being squared at one end and located in an accessible position at the outer end of the roller, is rotatable by a hand wrench. Acting through the gear 16, the hubs 14, the arms 32, the links 13 and the pivoted arms 11, this worm, when so rotated, operates to adjust and lock the retractile teeth 10 in the extreme protruding position shown in full lines in Fig. 3, or in the extreme retracted position indicated in broken lines in that figure or in any intermediate position, as may be desired. The teeth 10 have their free ends pointing forward in the direction in which they move in plowing, and are curved in approximate conformity with the circular arcs in which they move while being adjusted as described. Preferably each of these arcs has its radius approximately equal to one third that of the roller. Consequently these teeth, whether adjusted to protrude from the roller much or little, invariably enter the soil at a practically uniform predetermined angle, moving longitudinally in the direction of their own curvature and of their curate cycloidal orbits, and hence are driven into the soil with minimum resistance.

The gearing by which the power of the motor is applied to the rollers 1, comprises the pinion 18, keyed on the rotary driving shaft 19, the gear 20 keyed on the counter-shaft 21 and meshing with the pinion 18, the bevel pinion 22 keyed on that counter-shaft, a system of differential gearing 23 driven by the pinion 22, a transverse shaft comprising two alining portions 24 driven differentially, like the rear axle of an automobile, by the differential gearing 23, two parallel side shafts 25 driven from said shaft portions 24 respectively by intermediate beveled gears 26, and beveled pinions 27, the latter being keyed on shafts 25 and meshing with the racks 4 respectively.

On a transverse shaft 28, which is mounted behind the drum and is driven from one of the racks 4 by intermediate gearing 29, is carried a rotary pulverizer 30, having numerous radiating arms 31, which strike rapidly between the adjacent circumferential rows of the roller teeth 10.

The wheels 33 which carry the front end of the plow frame are steered by the hand-wheel 34 turning the axle 35 of those wheels through the intermediate chains 36, drums 37, drum-shaft 38, gear 39, worm 40 and wormshaft 41.

I wish it understood that my invention is not limited to any specific construction or arrangement of the parts except in so far as limitations are specified in the claims.

I claim as my invention—

1. A rolling-drum plow comprising a hollow power-driven roller having a plurality of tooth-holes through its cylindrical wall, a plurality of lever arms pivoted to the inside of said wall in advance of the tooth-holes respectively, a plurality of curved teeth carried by the lever arms and adjustable endwise thereby through the tooth-holes respectively, the curvature of the teeth being substantially concentric with their respective arm pivots, and approximately identical with the curvature of the orbits of the teeth as they enter the soil, hubs rotarily adjustable on the roller axle, links connecting the hubs with the lever arms, a gear secured to the hubs, and a worm mounted on the head of the roller to engage the gear.

2. A rolling-drum plow comprising a hollow power-driven roller having tooth-holes through its peripheral wall, lever arms pivoted to lugs on the inside of said wall in advance of the tooth-holes respectively, teeth having a curvature substantially concentric with their respective arm pivots and mounted on the lever arms to move endwise into the hollow interior of the roller and outward in the tooth-holes respectively in the direction of their own curvature and approximately in the direction of the curvature of their own orbits at the surface of the ground, hubs rotarily adjustable on the roller axle, links connecting the hubs to the lever arms respectively, and gearing for adjusting the hubs on the axle.

3. A rolling-drum plow comprising a hollow traction roller having tooth-holes through its peripheral wall, a plurality of lever arms pivoted within the roller in advance of the tooth-holes respectively, a plurality of curved teeth mounted on the pivoted arms respectively and movable endwise thereby into the hollow interior of the traction roller and outward in the tooth-holes respectively the curvature of the teeth being substantially concentric with their respective arm pivots, a plurality of hubs bolted together on the roller axle, links connecting the hubs to the lever arms respectively, and means for adjusting the hubs rotarily on the axle.

4. A rolling-drum plow, comprising a hollow roller having circumferential rows of tooth-holes through its peripheral wall, a plurality of lever arms approximately equal in length to one third the radius of the roller, arranged in circular groups within the roller and pivoted approximately in the rim thereof in advance of the tooth-holes respectively, a plurality of teeth carried by the lever arms respectively, curved circularly around their pivotal centers and registering with the tooth-holes respectively, and means for adjusting the lever arms in unison; the curvature of the teeth and of their pivotal movements being substantially identical with the cycloidal curvature of their movements while entering the soil.

5. A machine of the described class, comprising a hollow power-driven roller having tooth-holes through its peripheral wall, a plurality of lever arms pivoted in advance of the tooth-holes within the roller and near said wall, a plurality of curved teeth mounted on the free ends of the lever arms respectively and movable endwise thereby in the direction of their curvature into the hollow interior of the roller and outward in the tooth-holes, the curvature of the teeth and of their pivotal movements being substantially concentric and substantially identical with the curvature of their movements into the soil, means mounted within the roller for rotary movements relative thereto, links connecting said means with the pivoted arms, and mechanism for imparting predetermined rotary movements to said means to communicate through the links unitary oscillating movements to the arms.

In testimony whereof I hereunto subscribe my name in the presence of two witnesses.

WALTER B. PRUGH.

Witnesses:
 HIRAM L. HODGES,
 HIRAM W. CRAIG.

Copies of this patent may be obtained for five cents each, by addressing the "Commissioner of Patents, Washington, D. C."